US012266231B2

(12) United States Patent
Nordbeck

(10) Patent No.: US 12,266,231 B2
(45) Date of Patent: Apr. 1, 2025

(54) CONFIGURING ACCESS RIGHTS FOR AN ELECTRONIC KEY

(71) Applicant: ASSA ABLOY AB, Stockholm (SE)

(72) Inventor: Per Nordbeck, Skanör (SE)

(73) Assignee: ASSA ABLOY AB, Stockholm (SE)

( * ) Notice: Subject to any disclaimer, the term of this patent is extended or adjusted under 35 U.S.C. 154(b) by 59 days.

(21) Appl. No.: 18/254,502

(22) PCT Filed: Nov. 24, 2021

(86) PCT No.: PCT/EP2021/082856

§ 371 (c)(1),
(2) Date: May 25, 2023

(87) PCT Pub. No.: WO2022/112346

PCT Pub. Date: Jun. 2, 2022

(65) Prior Publication Data

US 2024/0005714 A1 Jan. 4, 2024

(30) Foreign Application Priority Data

Nov. 26, 2020 (SE) .................................... 2051379-2

(51) Int. Cl.
*G07C 9/00* (2020.01)

(52) U.S. Cl.
CPC . *G07C 9/00857* (2013.01); *G07C 2009/0088* (2013.01); *G07C 2209/04* (2013.01)

(58) Field of Classification Search
CPC .............................. G07C 9/00; G07C 2009/00
See application file for complete search history.

(56) References Cited

U.S. PATENT DOCUMENTS

| | | | |
|---|---|---|---|
| 8,943,187 | B1 | 1/2015 | Saylor |
| 2007/0157290 | A1 | 7/2007 | Crawford |
| 2008/0074235 | A1 | 3/2008 | Wong et al. |

(Continued)

FOREIGN PATENT DOCUMENTS

| | | |
|---|---|---|
| AU | 2017202802 | 5/2017 |
| EP | 3358534 | 8/2018 |
| WO | 2020014311 | 1/2020 |

OTHER PUBLICATIONS

Kurt Measom, "How AI can improve security entrances", Aug. 17, 2020, https://www.securityinfowatch.com/access-identity/access-control/article/21150569/how-ai-can-improve-security-entrances (Year: 2020).*

(Continued)

*Primary Examiner* — Daniell L Negron
(74) *Attorney, Agent, or Firm* — Schwegman Lundberg & Woessner, P.A.

(57) ABSTRACT

It is provided a method for configuring access rights for an electronic key (2) forming part of an access control system (10) comprising a plurality of electronic locks (12*a-c*, 13*a-c*, 14*a-c*) for securing access to respective physical spaces. The method is performed in a configuration device (1) and comprising: setting (40) a baseline configuration of access rights for the electronic key (2); receiving (42) access data, indicating at least one instance of the electronic key (2) being granted access by one of the plurality of electronic locks (12*a-c*, 13*a-c*, 14*a-c*); and adjusting (44) the configuration of access rights for the electronic key to restrict access compared to the baseline configuration, based on the access data.

18 Claims, 2 Drawing Sheets

(56) References Cited

U.S. PATENT DOCUMENTS

| | | | |
|---|---|---|---|
| 2008/0290990 A1 | 11/2008 | Schaffzin et al. | |
| 2014/0049366 A1 | 2/2014 | Vasquez | |
| 2017/0352207 A1 | 12/2017 | Siklosi | |
| 2019/0043293 A1 | 2/2019 | Ribas et al. | |
| 2019/0221062 A1 | 7/2019 | Spatig et al. | |

OTHER PUBLICATIONS

"Swedish Application Serial No. 2051379-2, 3rd Office Action mailed Apr. 18, 2024", 6 pages.
"International Application Serial No. PCT/EP2021/082856, International Search Report mailed Mar. 15, 2022", 6 pgs.
"International Application Serial No. PCT/EP2021/082856, Written Opinion mailed Mar. 15, 2022", 8 pgs.
"Swedish Application Serial No. 2051379-2, Office Action mailed Jun. 17, 2021", 10 pgs.
"Swedish Application Serial No. 2051379-2, Office Action mailed Dec. 8, 2022", 7 pgs.

* cited by examiner

CONFIGURING ACCESS RIGHTS FOR AN ELECTRONIC KEY

CROSS-REFERENCE TO RELATED APPLICATION(S)

This application is a national stage application under 35 U.S.C. § 371 of PCT Appl. No. PCT/EP2021/082856, titled "Configuring Access Rights for an Electronic Key," filed Nov. 24, 2021, which claims priority to Swedish Patent Appl. No. 2051379-2, filed Nov. 26, 2020, each of which is incorporated herein by reference in its entirety.

TECHNICAL FIELD

The present disclosure relates to the field of access control systems for physical access control, and in particular to configuring access rights for an electronic key of such an access control system.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

With electronic locks, access rights need to be configured for each electronic key that is to have access. The process of configuring access for users and their electronic keys is labour intensive.

It would be of great benefit if there were a way to reduce the manual workload when access rights are to be defined for electronic keys.

SUMMARY

One object is to reduce manual workload when configuring access rights for an electronic key.

According to a first aspect, it is provided a method for configuring access rights for an electronic key forming part of an access control system comprising a plurality of electronic locks for securing access to respective physical spaces. The method is performed in a configuration device and comprising: setting a baseline configuration of access rights for the electronic key; receiving access data, indicating at least one instance of the electronic key being granted access by one of the plurality of electronic locks; and adjusting the configuration of access rights for the electronic key to restrict access compared to the baseline configuration, based on the access data.

The adjusting may comprises configuring access rights for the electronic key such that access is revoked for at least one electronic lock for which the access data fails to indicate any unlocking by the electronic key.

The adjusting may comprises configuring access rights for the electronic key such that access is revoked for a group of electronic locks for which the access data indicates unlocking by the electronic key less than a threshold number of times.

The group of electronic locks may correspond to a defined physical area.

In the adjusting, only access data might be considered that has an indication of time in a predetermined time prior to performing the adjusting the configuration.

The access data may be in the form of access logs.

The access data may be in the form of online access data from the plurality of locks and/or the electronic key.

The configuration for the electronic key may be set and adjusted by providing access right data to the electronic key.

The configuration for the electronic key may be set and adjusted by configuring an online component of the access control system.

The adjusting may be based on a machine learning model with the access data as input.

According to a second aspect, it is provided a configuration device for configuring access rights for an electronic key forming part of an access control system comprising a plurality of electronic locks for securing access to respective physical spaces. The configuration device comprises: a processor; and a memory storing instructions that, when executed by the processor, cause the configuration device to: seta baseline configuration of access rights for the electronic key; receive access data, indicating at least one instance of the electronic key being granted access by one of the plurality of electronic locks; and adjust the configuration of access rights for the electronic key to restrict access compared to the baseline configuration, based on the access data.

The instructions to adjust may comprise instructions that, when executed by the processor, cause the configuration device to configure access rights for the electronic key such that access is revoked for at least one electronic lock for which the access data fails to indicate any unlocking by the electronic key.

The instructions to adjust may comprise instructions that, when executed by the processor, cause the configuration device to configure access rights for the electronic key such that access is revoked for a group of electronic locks for which the access data indicates unlocking by the electronic key less than a threshold number of times.

The group of electronic locks may correspond to a defined physical area.

Only access data might be considered that has an indication of time in a predetermined time prior to performing the instructions to adjust the configuration.

The access data may be in the form of access logs.

The access data may be in the form of online access data from the plurality of locks and/or the electronic key.

The configuration for the electronic key may be set and adjusted by providing access right data to the electronic key.

The configuration for the electronic key may be set and adjusted by configuring an online component of the access control system.

The instructions to adjust may comprise instructions that, when executed by the processor, cause the configuration device to obtain the adjusted access rights is based on a machine learning model with the access data as input.

According to a third aspect, it is provided a computer program for configuring access rights for an electronic key forming part of an access control system comprising a plurality of electronic locks for securing access to respective physical spaces. The computer program comprises computer program code which, when executed on a configuration device causes the configuration device to: setting a baseline configuration of access rights for the electronic key; receiving access data, indicating at least one instance of the electronic key being granted access by one of the plurality of electronic locks; and adjusting the configuration of access rights for the electronic key to restrict access compared to the baseline configuration, based on the access data.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, a configuration device adjusts access rights for an electronic key over time based on usage patterns of the electronic key. Specifically, when a new electronic key is added to the system, it is initially granted wide access. For instance, the new electronic key can be granted access to all doors of a building or all doors of a site of multiple buildings or all doors in different geographical places. As the new electronic key is used to unlock electronic locks, the usage pattern is recorded. Access to electronic locks that are never used or areas that are never used are eventually removed for the new electronic key. This process can continue, whereby access rights for the new electronic key is eventually tailored to actual use of the new electronic key. This greatly reduces the amount of manual administration to set an appropriate set of access rights for the electronic key.

Figure 1:
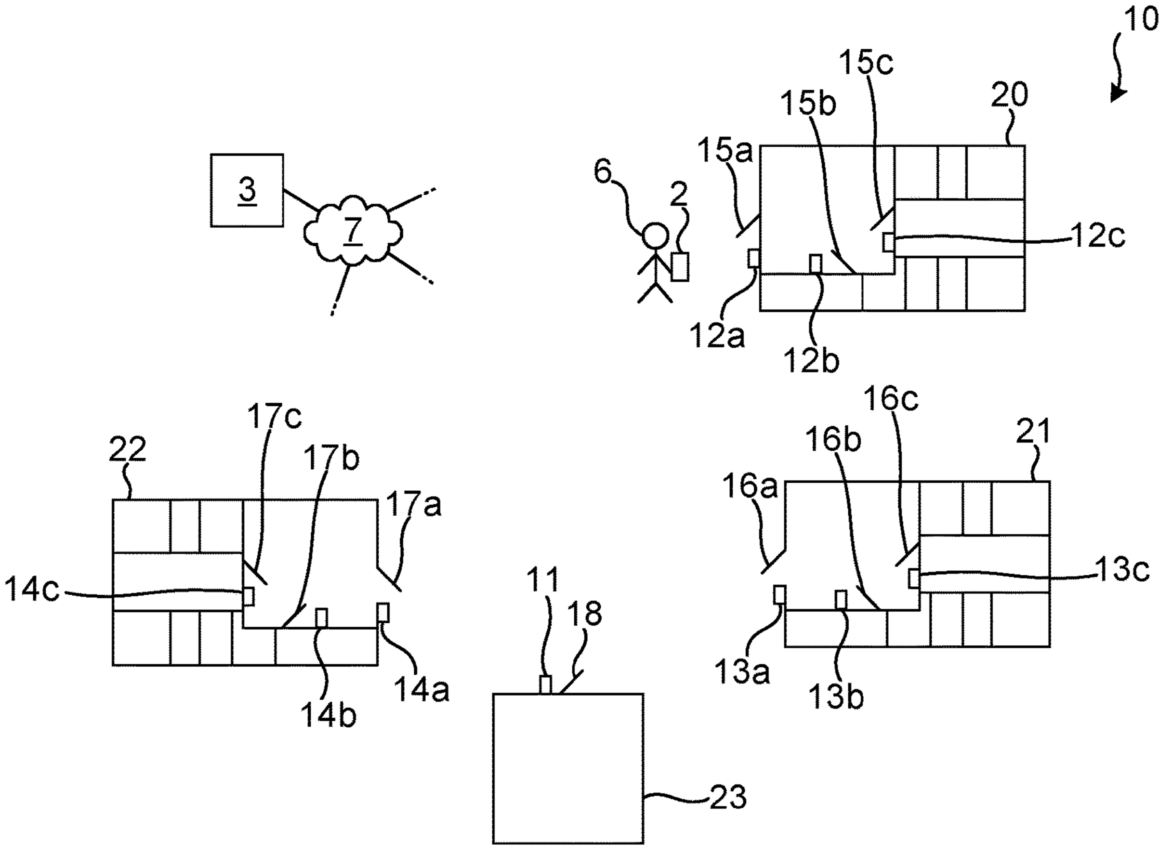
FIG. 1 is a schematic diagram illustrating an environment in which embodiments presented herein can be applied.

FIG. 1 is a schematic diagram illustrating an environment in which embodiments presented herein can be applied. An (electronic) access control system 10 contains a plurality of electronic locks 12*a-c*, 13*a-c*, 14*a-c* and optionally one or more online components, such as a server 3.

A first set of electronic locks 12*a-c* are provided in a first building 20, for securing access to respective physical spaces (i.e. rooms or set of rooms). A first electronic lock 12*a* is provided to selectively lock or unlock access through a first door 15*a*. A second electronic lock 12*b* is provided to selectively lock or unlock access through a second door 15*b*. A third electronic lock 12C is provided to selectively lock or unlock access through a third door 15*c*. A second set of electronic locks 13*a-c* are provided in a second building 21, for securing access to respective physical spaces. A fourth electronic lock 13*a* is provided to selectively lock or unlock access through a fourth door 16*a*. A fifth electronic lock 13*b* is provided to selectively lock or unlock access through a fifth door 16*b*. A sixth electronic lock 13*c* is provided to selectively lock or unlock access through a sixth door 16*c*. A third set of electronic locks 14*a-c* are provided in a third building 22, for securing access to respective physical spaces. A seventh electronic lock 14*a* is provided to selectively lock or unlock access through a seventh door 17*a*. An eighth electronic lock 14*b* is provided to selectively lock or unlock access through an eighth door 17*b*. A ninth electronic lock 14*c* is provided to selectively lock or unlock access through a ninth door 17*c*. A fourth building 23 is provided with a single electronic lock 11 to selectively lock or unlock access through a tenth door 18.

A user 6 carries an electronic key 2. The electronic key 2 can be in any suitable format that allows an electronic lock to communicate (wirelessly or conductively) with the electronic key to evaluate whether to grant access. For instance, the electronic key 2 can be in the form of a key fob, a key card, a hybrid mechanical/electronic key or embedded in a smartphone. Depending on the access rights for the electronic key 2, it can be used to unlock one or more of the electronic locks 12*a-c*, 13*a-c*, 14*a-c*. It is to be noted that, while only one electronic key 2 and user 6 are shown in FIG. 1, there can be any suitable number of users with respective electronic keys.

The server 3 can be used to control access rights for electronic keys in the access control system 10. The server 3 can be connected to a communication network 7, which can be an internet protocol (IP) based network. The communication network 7 can e.g. comprise any one or more of a wired local area network, a local wireless network, a cellular network, a wide area network (such as the Internet), etc. The communication network 7 can be used for communication between the server 3 and any online components of the access control system 10, e.g. all or a subset of the electronic locks 12*a-c*, 13*a-c*, 14*a-c* and/or the electronic key 2.

When the electronic key 2 is provided to one of the electronic locks 12*a-c*, 13*a-c*, 14*a-c*, the electronic lock in question checks the access rights for the electronic key to determine whether to grant or deny access, according to any suitable method. For instance, the access rights can be provided by the electronic key 2 to the electronic lock, in which case the access rights can be cryptographically signed and/or encrypted by a party trusted by the electronic lock, such as the server 3. Alternatively, the electronic lock is online and, after obtaining the identity of the electronic key 2, the electronic lock checks with the server 3 to determine whether the electronic key is to be allowed access. Alternatively or additionally, the electronic lock has access (locally or remotely) to white lists (indicating identities of electronic keys to be granted access) and/or blacklists (indicating identities of electronic keys to be denied access).

FIGS. 2A-D are schematic diagrams illustrating embodiments of where the configuration device 1 can be implemented.

Figure 2A:
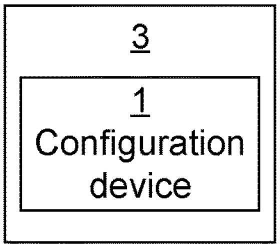
FIGS. 2A-D are schematic diagrams illustrating embodiments of where the configuration device can be implemented.

In FIG. 2A, the configuration device 1 is shown implemented in the server 3. The server 3 is thus the host device for the configuration device 1 in this implementation.

Figure 2B:
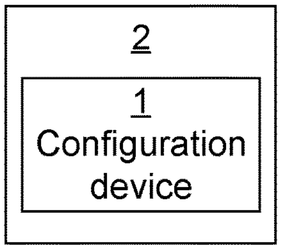

In FIG. 2B, the configuration device 1 is shown implemented in the electronic key 2. The electronic key 2 is thus the host device for the configuration device 1 in this implementation.

Figure 2C:
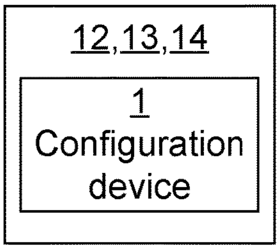

In FIG. 2C, the configuration device 1 is shown implemented in one or more of the electronic locks 12, 13, 14 (corresponding to the electronic locks 12*a-c*, 13*a-c*, 14*a-c* of FIG. 1). The electronic lock is thus the host device for the configuration device 1 in this implementation.

Figure 2D:
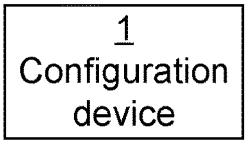

In FIG. 2D, the configuration device 1 is shown implemented as a stand-alone device. The configuration device 1 thus does not have a host device in this implementation.

Figure 3:
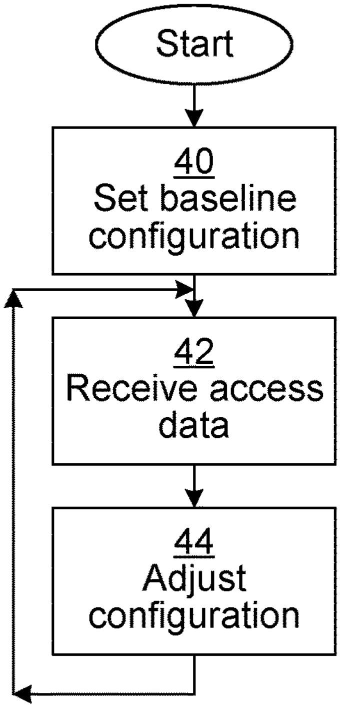
FIG. 3 is a flow chart illustrating embodiments of methods for configuring access rights for an electronic key.

FIG. 3 is a flow chart illustrating embodiments of methods for configuring access rights for an electronic key. The electronic key forms part of an access control system 10 comprising a plurality of electronic locks 12*a-c*, 13*a-c*, 14*a-c* for securing access to respective physical spaces. The method is performed in a configuration device 1. It is to be noted that while the embodiments presented here concern a single electronic key 2, the embodiments can be applied for a plurality of electronic keys of the access control system 10.

The embodiments will be illustrated with an example in the context of a university campus, also with reference to FIG. 1. In the example, a new student is starting attendance at the university. The student is allocated a room in a dormitory in the first building 20. There are also dormitories in the second building 21 and the third building 22. The fourth building 23 contains a gym and a swimming pool.

In a set baseline configuration step 40, the configuration device 1 sets a baseline configuration of access rights for the electronic key 2. The baseline configuration can be to allow wide access for the electronic key 2, e.g. all electronic locks of the access control system or all electronic locks in a defined area (e.g. set of buildings) of the access control system.

In our example, the new student is provided with an electronic key, either physically, e.g. as a key card in a letter, or electronically, e.g. to the smartphone of the student. According to this step, this electronic key is initially given wide access, e.g. to all electronic locks of all four buildings 20, 21, 22, 23 of the campus. It is to be noted that only electronic locks to common areas are included here; electronic locks or physical locks to individual rooms in the dormitory are not included in this wide access. Access for the new student to her own room is provided either using a mechanical key or as a separately managed access right on the electronic key, to prevent this method from revoking the access right to her own room, e.g. if on vacation or exchange programme.

In a receive access data step 42, the configuration device 1 receives access data, indicating at least one instance of the electronic key 2 being granted access by one of the plurality of electronic locks 12*a-c*, 13*a-c*, 14*a-c*. The access data can be in the form of access logs that are obtained regularly (e.g. daily, weekly, etc.). Alternatively or additionally, the access data is in the form of online access data from the plurality of locks 12*a-c*, 13*a-c*, 14*a-c* and/or the electronic key 2. The access data indicates granted and optionally also denied access events for the electronic key. The access data can also include such data for access events for many other electronic keys.

In our example, the access data can indicate that the (specific) electronic key 2 is used for gaining access to areas of the first building 20 (her dormitory) and the fourth building 23 (the gym and swimming pool). Also, the access data indicates that the electronic key 2 is used for access to the third building 22. The access data reflects that the user 6 lives in the first building 20 and uses the gym/swimming pool in the fourth building 23 and visits the third building 22 from time to time, e.g. to meet up with friends there.

In an adjust configuration step 44, the configuration device 1 adjusts the configuration of access rights for the electronic key to restrict access compared to the baseline configuration, based on the access data.

In one embodiment, access rights for the electronic key are configured such that access is revoked for at least one electronic lock for which the access data fails to indicate any unlocking by the electronic key 2. In other words, in this embodiment, when the electronic key has not been used to unlock a particular electronic lock (optionally for a particular period of time), access rights to open that particular electronic lock is revoked for the electronic key.

In one embodiment, access rights for the electronic key are configured such that access is revoked for a group of electronic locks for which the access data indicates unlocking by the electronic key 2 less than a threshold number of times. The group of electronic locks can correspond to a defined physical area, such as a building, a floor of a building or a group of buildings.

In our example, since there is no indication of the electronic key 2 being used to access the second building 21, the access rights are adjusted by revoking access for the electronic key for the electronic locks 13*a-c* of the second building 21. These electronic locks 13*a-c* form a group of electronic locks corresponding to the second building 21.

Optionally only access data is considered that has an indication of time in a predetermined time prior to performing the adjust configuration step 44, or prior to any other step of the method. In other words, only access data in the last predefined time period (e.g. x number of days, weeks or months) is considered. In our example, the new student might have explored the campus and entered all buildings initially, but then after a while, the pattern of movement settles to a more stable set of buildings and locks. By only considering access data in the last predefined number of days, the initial exploration of the campus is eventually disregarded.

The configuration for the electronic key can be is set and adjusted by providing access right data to the electronic key. Alternatively or additionally, the configuration for the electronic key is set and adjusted by configuring an online component of the access control system. The online component can e.g. be the server 3 or electronic locks forming shell protection of a building. In other words, the embodiments presented herein can be applied for different implementations of access control.

It can thus be seen how embodiments presented herein adapts access rights for the electronic key without any manual input, in accordance with usage patterns of the electronic key, reflecting actual usage and movement of the user 6. This solution is particularly useful for adapting access rights in an access control system containing common areas, such as a campus, an office building or even a residential building or building complex with common areas, where the initial wide access does not pose a significant security risk.

Figure 4:
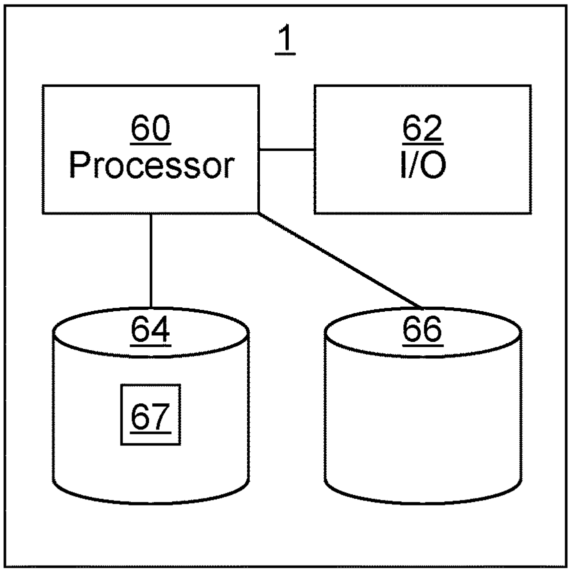
FIG. 4 is a schematic diagram illustrating components of the configuration device of FIGS. 2A-D according to one embodiment.

FIG. 4 is a schematic diagram illustrating components of the configuration device 1 of FIGS. 2A-D. It is to be noted that, when the configuration device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The configuration device 1 further comprises an I/O interface 62 for communicating with external and/or internal entities. Optionally, the I/O interface 62 also includes a user interface.

Other components of the configuration device are omitted in order not to obscure the concepts presented herein.

Figure 5:
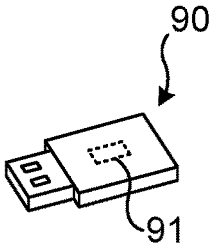
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 3. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for configuring access rights for an electronic key forming part of an access control system comprising a plurality of electronic locks for securing access to respective physical spaces, the method being performed by a configuration device, the method comprising:

setting a baseline configuration of access rights for the electronic key;

receiving access data, indicating at least one instance of the electronic key being granted access by one of the plurality of electronic locks; and adjusting the configuration of access rights for the electronic key, based on the access data, to restrict access compared to the baseline configuration, wherein the adjusting comprises configuring access rights for the electronic key such that access is revoked for at least one of the electronic locks based on the access data failing to indicate any unlocking of the at least one of the electronic locks by the electronic key.

2. The method according to claim 1, wherein the adjusting comprises configuring access rights for the electronic key such that access is revoked for a group of the electronic locks for which the access data indicates unlocking by the electronic key less than a threshold number of times.

3. The method according to claim 2, wherein the group of the electronic locks corresponds to a defined physical area.

4. The method according to claim 1, wherein in the adjusting, only access data is considered that has an indication of time in a predetermined time prior to performing the adjusting the configuration.

5. The method according to claim 1, wherein the access data is in the form of access logs.

6. The method according to claim 1, wherein the access data is in the form of online access data from at least one of: the electronic key or at least one of the plurality of locks.

7. The method according to claim 1, wherein the configuration for the electronic key is set and adjusted by providing access right data to the electronic key.

8. The method according to claim 1, wherein the configuration for the electronic key is set and adjusted by configuring an online component of the access control system.

9. The method according to claim 1, wherein the adjusting is based on a machine learning model with the access data as input.

10. A configuration device for configuring access rights for an electronic key forming part of an access control system comprising a plurality of electronic locks for securing access to respective physical spaces, the configuration device comprising:

a processor; and a memory storing instructions that, when executed by the processor, cause the configuration device to:

set a baseline configuration of access rights for the electronic key;

receive access data, indicating at least one instance of the electronic key being granted access by one of the plurality of electronic locks; and adjust the configuration of access rights for the electronic key, based on the access data, to restrict access compared to the baseline configuration, wherein the instructions to adjust comprise instructions that, when executed by the processor, cause the configuration device to configure access rights for the electronic key such that access is revoked for at least one of the electronic locks based on the access data failing to indicate any unlocking of the at least one of the electronic locks by the electronic key.

11. The configuration device according to claim 10, wherein the instructions to adjust comprise instructions that, when executed by the processor, cause the configuration device to configure access rights for the electronic key such that access is revoked for a group of the electronic locks for which the access data indicates unlocking by the electronic key less than a threshold number of times.

12. The configuration device according to claim 11, wherein the group of the electronic locks corresponds to a defined physical area.

13. The configuration device according to claim 10, wherein only access data is considered that has an indication of time in a predetermined time prior to performing the instructions to adjust the configuration.

14. The configuration device according to claim 10, wherein the access data is in the form of access logs.

15. The configuration device according to claim 10, wherein the access data is in the form of online access data from at least one of: the electronic key or at least one of the plurality of locks.

16. The configuration device according to claim 10, wherein the configuration for the electronic key is set and adjusted by providing access right data to the electronic key.

17. The configuration device according to claim 10, wherein the configuration for the electronic key is set and adjusted by configuring an online component of the access control system.

18. A non-transitory computer readable storage medium storing a computer program for configuring access rights for an electronic key forming part of an access control system comprising a plurality of electronic locks for securing access to respective physical spaces, the computer program comprising computer program code which, when executed on a configuration device, causes the configuration device to:

set a baseline configuration of access rights for the electronic key;

receive access data, indicating at least one instance of the electronic key being granted access by one of the plurality of electronic locks; and adjust the configuration of access rights for the electronic key, based on the access data, to restrict access compared to the baseline configuration, wherein the computer program code to adjust comprises computer program code to configure access rights for the electronic key such that access is revoked for at least one of the electronic locks based on the access data failing to indicate any unlocking of the at least one of the electronic locks by the electronic key.

* * * * *